(12) United States Patent
Choi (10) Patent No.: US 7,407,424 B2
(45) Date of Patent: Aug. 5, 2008

(54) SPATIAL NAVIGATION SYSTEM AND METHOD FOR PROGRAMMABLE FLYING OBJECTS

(75) Inventor: Kei Fung Choi, Causeway Bay (HK)

(73) Assignee: Silverlit Toys Manufactory, Ltd., Hong Kong (HK)

( * ) Notice: Subject to any disclaimer, the term of this patent is extended or adjusted under 35 U.S.C. 154(b) by 60 days.

(21) Appl. No.: 11/033,219

(22) Filed: Jan. 10, 2005

(65) Prior Publication Data
US 2006/0155508 A1 Jul. 13, 2006

(51) Int. Cl.
A63H 27/127 (2006.01)
(52) U.S. Cl. .................. 446/37; 446/175; 446/456; 446/34
(58) Field of Classification Search .......... 367/907, 367/99, 128, 126; 178/18.04, 19.02; 201/3, 201/201, 206; 446/456, 232, 175, 37, 34; 244/120; 364/460
See application file for complete search history.

(56) References Cited

U.S. PATENT DOCUMENTS

| | | | |
|---|---|---|---|
| 2,956,278 A * | 10/1960 | Branchu | 367/128 |
| 3,246,424 A | 4/1966 | Gregory | |
| 3,473,256 A | 10/1969 | Tyler | |
| 3,570,467 A | 3/1971 | Belokin, Jr. | |
| 4,180,939 A | 1/1980 | Matsushiro | |
| 4,781,642 A | 11/1988 | Stanzel | |
| 4,853,863 A * | 8/1989 | Cohen et al. | 701/300 |
| 5,229,541 A | 7/1993 | Will et al. | |
| 5,383,810 A | 1/1995 | Loving | |
| 5,474,482 A | 12/1995 | Davidson | |
| 5,571,038 A * | 11/1996 | Halling | 446/232 |
| 5,647,558 A | 7/1997 | Linick | |
| 5,672,086 A | 9/1997 | Dixon | |
| 5,836,545 A * | 11/1998 | Arlton et al. | 244/60 |
| 6,074,265 A | 6/2000 | Barthold | |
| 6,112,141 A * | 8/2000 | Briffe et al. | 701/14 |
| 6,422,509 B1 | 7/2002 | Yim | |
| 6,612,893 B2 | 9/2003 | Rehkemper et al. | |
| 6,688,936 B2 | 2/2004 | Davis | |
| 6,772,086 B2 | 8/2004 | Van Wagoner, III | |
| 6,793,172 B2 | 9/2004 | Liotta | |
| 6,811,460 B1 | 11/2004 | Tilbor et al. | |
| 6,840,480 B2 * | 1/2005 | Carroll | 244/120 |
| 7,039,421 B2 * | 5/2006 | Couronne et al. | 455/456.1 |
| 2002/0067660 A1 * | 6/2002 | Bokhour | 367/128 |
| 2002/0142699 A1 | 10/2002 | Davis | |
| 2003/0134562 A1 | 7/2003 | Lee | |
| 2003/0148703 A1 * | 8/2003 | Scott et al. | 446/456 |
| 2007/0105474 A1 | 5/2007 | Gotou et al. | |
| 2007/0117492 A1 | 5/2007 | Sze et al. | |

* cited by examiner

*Primary Examiner*—Gene Kim
*Assistant Examiner*—Urszula M Cegielnik
(74) *Attorney, Agent, or Firm*—Greenberg Traurig, LLP (57) ABSTRACT

A flying toy can determine its orientation and position in a space by calculating the distance to three reference points on the ground. The flying toy uses three ultrasonic transmitters as the three reference points. The distance to each ultrasonic transmitter is calculated by a microprocessor integrated in the flying toy which records the time it takes for the ultrasonic signal to travel from each of the ultrasonic transmitters to the flying toy. Once the distances to each of the ultrasonic transmitters are known, the microcontroller in the flying toy determines the position in space of the flying toy using trilateration methods. The flying toy can fly on autopilot according to predetermined regions, and prevent crashes by using is positioning data.

17 Claims, 10 Drawing Sheets

SPATIAL NAVIGATION SYSTEM AND METHOD FOR PROGRAMMABLE FLYING OBJECTS

BACKGROUND OF THE DISCLOSURE

1. Field of the Disclosure

The present disclosure relates to flying toys. In particular, it relates to systems and methods for controlling the navigation of programmable flying toys.

2. General Background

Existing toy aircraft have generally been designed for remote control where the aircraft does not know its position or orientation in space. Rather, with a combination of propellers driven by a motor, an engine or the like, elevators and rudders, the toy aircraft flies only according to command signals received from a user during flight.

These toy aircraft are generally difficult to operate because they require expertise to achieve a successful flight. Consequently, beginners can become frustrated because of disastrous results during the first time flights. Additionally, attempting to initiate a successful flight can be time-consuming which reduces the enjoyment of the activity.

A significant contributor to the difficulty of operating toy aircraft is that the toy is not equipped with spatial positioning data. The toy receives command signals and blindly follows any command which at times results in disastrous crashes. Furthermore, current toys do not provide the user with the ability to preprogram flight sequences, paths, etc.

SUMMARY

In one aspect, there is a method of determining the position of a moving object (e.g. a flying toy) in a space. A first distance from an ultrasonic receiver mounted on the moving object to a first ultrasonic transmitter located at a ground station unit is determined. Then a second distance from the ultrasonic receiver mounted on the moving object to a second ultrasonic transmitter located at the ground station unit is determined. Then it is determined a third distance from the ultrasonic receiver mounted on the moving object to a third ultrasonic transmitter located at the ground station unit. Lastly, the first distance, the second distance and the third distance are utilized to determine the position of the moving object in relation to the ground station unit. The position of the moving object in relation to the ground station unit can be determined by using trilateration.

The first distance can be determined by emitting an infrared light signal from the moving object to an infrared light receiver located at the ground station unit. Then, a time counter is initiated upon transmitting the infrared light signal. Next, a first ultrasonic signal is received from the first ultrasonic transmitter. The time counter is stopped upon receiving the first ultrasonic signal. Then, a predetermined speed constant is multiplied by a time indicated by the time counter.

The second distance can be determined by emitting the infrared light signal from the moving object to the infrared light receiver located at the ground station unit. Then, the time counter is reinitiated upon transmitting the infrared light signal. Next, second ultrasonic signal is received from the second ultrasonic transmitter. The time counter is stopped upon receiving the second ultrasonic signal. Then, the predetermined speed constant is multiplied by the time indicated by the time counter.

In another aspect, the second distance can be determined by reinitiating the time counter after a predetermined amount of time and then receiving a second ultrasonic signal from the second ultrasonic transmitter. The second ultrasonic signal can be sent after the predetermined amount of time passed since the first ultrasonic signal was received. The time counter is then stopped upon receiving the second ultrasonic signal at the ultrasonic receiver. The second distance will be product of the speed constant and the time counter.

The third distance can be determined by emitting the infrared light signal from the moving object to the infrared light receiver located at the ground station unit. Then, the time counter is reinitiated upon transmitting the infrared light signal. Next, third ultrasonic signal is received from the third ultrasonic transmitter. The time counter is stopped upon receiving the third ultrasonic signal. Then, the predetermined speed constant is multiplied by the time indicated by the time counter.

In another aspect, the third distance can be determined by reinitiating the time counter after a predetermined amount of time and then receiving a third ultrasonic signal from the third ultrasonic transmitter. The third ultrasonic signal can be sent after the predetermined amount of time elapsed since the second ultrasonic signal was received. The time counter is then stopped upon receiving the third ultrasonic signal at the ultrasonic receiver. The third distance will be product of the speed constant and the time counter.

In another aspect, the first ultrasonic signal, the second ultrasonic signal, and the third ultrasonic signal have different ultrasonic frequencies from each other. Each ultrasonic signal may be received by one or more ultrasonic receivers.

In yet another aspect, the moving object is configured to reach a specific destination by using the position of the moving object in relation to the specific destination. The moving object can also be configured to follow a specific path defined by a plurality of specific destinations.

In one aspect, there is a spatial navigation system to control a flying object (e.g. flying toy). A space unit is mounted on the flying object. The space unit includes an ultrasonic receiver, an infrared light emitter and a microprocessor. The microprocessor can be configured to calculate a spatial position of the space unit based on a time differential between the time at which an infrared light is emitted by the infrared light emitter and the time at which ultrasonic signals are received by the ultrasonic receiver. The microprocessor can perform such calculation by using trilateration. A ground station unit has three ultrasonic transmitters, an infrared light receiver, and a base microprocessor. Each ultrasonic transmitter is distributed at each vertex of a predetermined equilateral triangle. The base microprocessor is configured to transmit an ultrasonic signal from each ultrasonic transmitter after detecting the infrared light emitted by the infrared light emitter.

In another aspect, the flying object includes a motor control unit that controls a plurality of motors, the motor control unit coupled with the microprocessor.

In yet another aspect, spatial navigation system also includes a second ultrasonic receiver and a remote control system using radio frequency modulation.

In another aspect, the base microprocessor transmits an ultrasonic signal from each ultrasonic transmitter consecutively to the space unit. Alternatively, the base microprocessor can transmit an ultrasonic signal from each ultrasonic transmitter simultaneously. Each ultrasonic signal from each ultrasonic transmitter can have a different ultrasonic frequency form each other.

In one aspect, there is a method of preventing crashes of a moving object against a surface. A first distance from an ultrasonic receiver mounted on the moving object to a first ultrasonic transmitter located at a surface (e.g. a wall or a floor) is determined. Then a second distance from the ultrasonic receiver mounted on the moving object to a second ultrasonic transmitter located at the surface is determined. Then it is determined a third distance from the ultrasonic receiver mounted on the moving object to a third ultrasonic transmitter located at the surface. The first distance, the second distance and the third distance are utilized to determine the position of the moving object in relation to the surface. Lastly, any movement of the flying object towards the surface prevented according to the position of the flying object.

In another aspect, there is a method of determining the position of a moving object in a space by determining a first distance from a sonic receiver mounted on the moving object to a first sonic transmitter located at a ground station unit, determining a second distance from the sonic receiver mounted on the moving object to a second sonic transmitter located at the ground station unit, determining a third distance from the sonic receiver mounted on the moving object to a third sonic transmitter located at the ground station unit, and utilizing the first distance, the second distance and the third distance to determine the position of the moving object in relation to the ground station unit.

In one aspect, there is method of determining the orientation of a moving object in a space. The method first determines the position in space of a first point on the moving object. Then the position in space of a second point on the moving object is determined. Finally, the direction of movement is established to be parallel to a line defined by the first point and the second point.

The position in space of the first point is established by determining a first distance from an ultrasonic receiver mounted on the moving object to a first ultrasonic transmitter located at a ground station unit. Then a second distance from the ultrasonic receiver mounted on the moving object to a second ultrasonic transmitter located at the ground station unit is determined. Then it is determined a third distance from the ultrasonic receiver mounted on the moving object to a third ultrasonic transmitter located at the ground station unit. Lastly, the first distance, the second distance and the third distance are utilized to determine the first point in space in relation to the ground station unit. The position in space of the second point can be established in like manner.

BRIEF DESCRIPTION OF THE DRAWINGS

By way of example, reference will now be made to the accompanying drawings.

DETAILED DESCRIPTION

The method and system described below provide an improved way to navigate a flying toy as a helicopter, an airplane, a UFOs, etc. The flying toy is able to determine its position in a space by calculating the distance to three reference points on the ground. The flying toy uses three ultrasonic transmitters as the three reference points by timing an ultrasonic signal emitted from each of the ultrasonic transmitters to the flying toy. The ultrasonic signals used are acoustic waves with a frequency imperceptible by the human ear (i.e. higher than twenty thousand cycles per second or 20 KHz). As such, the ultrasonic signals are unnoticeable to the user. Further, sonic signals can also be used because they are equally functional although they will be noticeable by a user. Likewise, instead of infrared signals, which are invisible signals in the electromagnetic spectrum, other electromagnetic waves can be used such as radio or visible light signals.

Unlike previous navigation methods, the method and system described below allow the flying toy to calculate its position and orientation in space permitting the toy to maneuver more intelligently. For instance, the flying toy can automatically fly within a limited region, be preprogrammed to follow flight sequences or navigation paths, or compensate for user errors avoiding crashes on the ground. These and other features will be described below.

Figure 1:
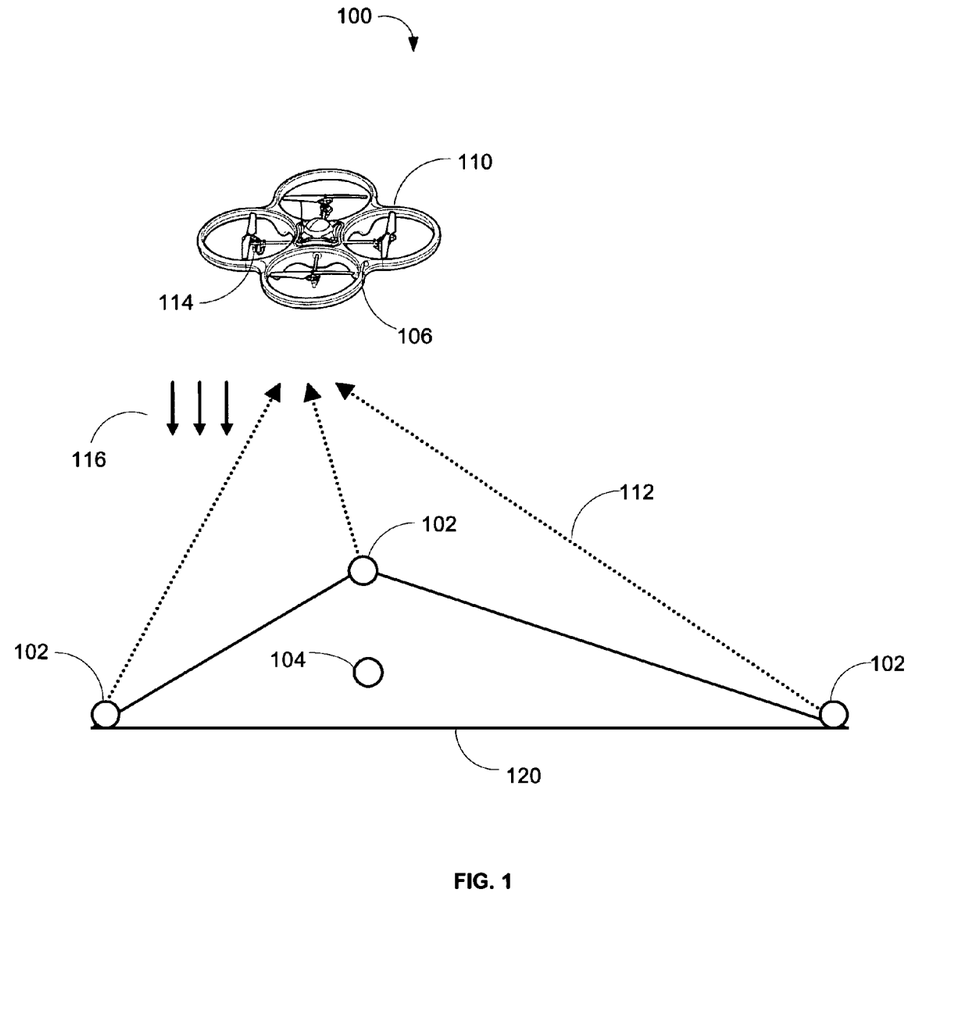
FIG. 1 illustrates a perspective view of a spatial navigation system for flying toys.

FIG. 1 illustrates a perspective view of a spatial navigation system 100 for flying toys. The spatial navigation system 100 comprises a space unit 110 and a ground station unit 120. The space unit 110 and the ground station unit 120 communicate with each other by using infrared 116 and ultrasonic signals 112. For that purpose, the ground station unit 120 includes three ultrasonic transmitters 102 distributed away from each other forming a triangle. In one approach, the ultrasonic transmitters 102 may be located equidistant from each other as to establish an equilateral triangle having a transmitter 102 at each vertex. In some embodiments, the three ultrasonic transmitters 102 may be enclosed in the same housing as other components of the ground station unit 120. In other embodiments, the ultrasonic transmitters 102 may not be enclosed in the same housing yet they can be connected the rest of the ground station unit 120 via wired or wireless media. The ground station unit 120 also includes an infrared light receiver 104. In one embodiment, the infrared light receiver 104 can be positioned near the center of gravity of the triangle for better infrared reception.

The space unit 110, on the other hand, comprises at least one infrared emitter 114 and at least one ultrasonic receiver 106. The infrared emitter 114 can be a diode or an incandescent light emitting infrared light. The emitted infrared light 116 is then received by the infrared light receiver 104 in the ground station unit. In like manner, the ultrasonic signals emitted by the ultrasonic transmitters 102 are received by the ultrasonic receiver 106.

Figure 2A:
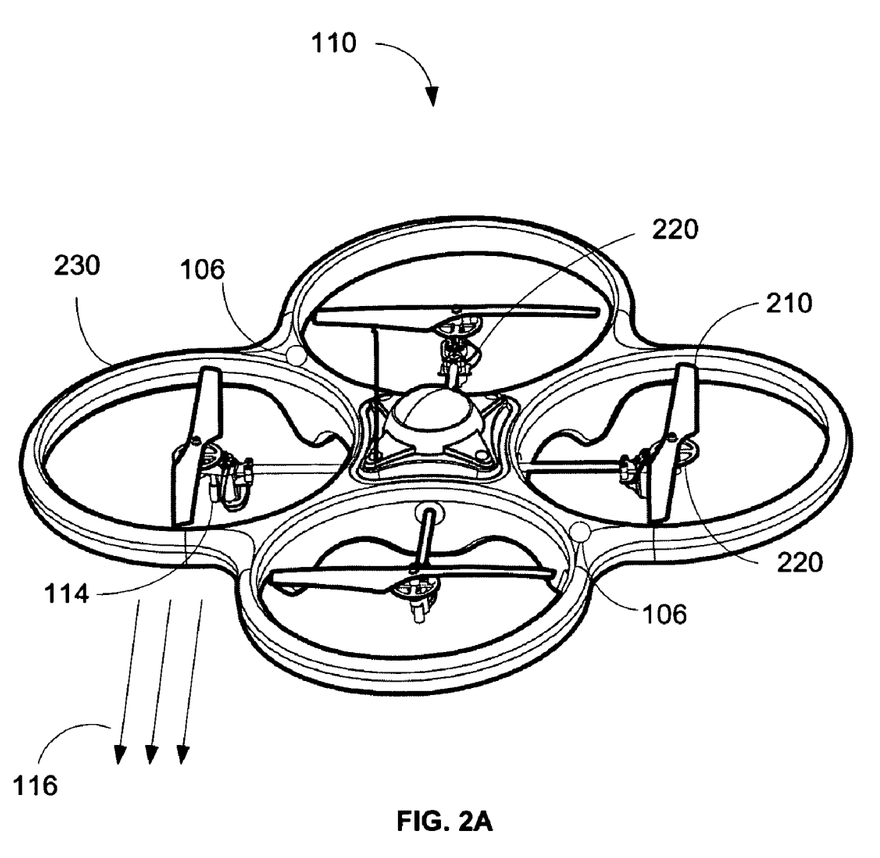
FIG. 2A illustrates a perspective view of a space unit.

FIG. 2A illustrates a perspective view of the space unit 110. In one embodiment, the space unit 110 can be a hovering flying vehicle having a carbon fiber supporting skeleton. The space unit 110 can have four propellers 210 each driven by a motor 220. The motors 220 operate the propellers 210 necessary through suitable mechanical connections and gearing. Four lightweight outer rings 230 provide protection by absorbing any impact from crashing. In other embodiments, the space unit 110 can have a plurality of propellers 210 propelled by a plurality of motors 220 which are encircled by a plurality of outer rings 230.

In one embodiment, the space unit 110 can have two downward-facing ultrasonic receivers 106 separately mounted on bottom part of the space unit 110. Likewise, an infrared emitter diode 114 can be mounted on the bottom in order to emit infrared signals to the ground station unit 120.

Figure 2B:
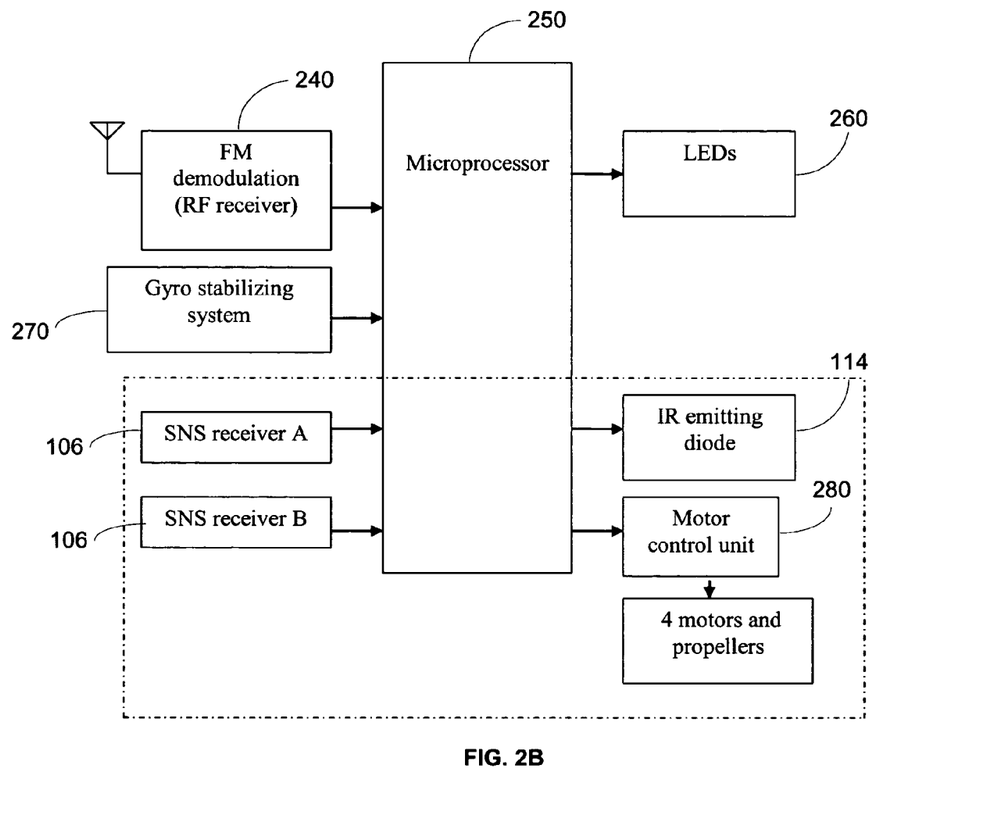
FIG. 2B illustrates a block diagram of the components of the space unit depicted in FIG. 2A.

FIG. 2B illustrates a block diagram of some of the components of the space unit 110 depicted in FIG. 2A. In particular, a microprocessor 250 is coupled to the ultrasonic receivers 106, the infrared emitter 114 and a motor control unit 280. The microprocessor 250 is pre-programmed with control software that calculates the movement of the space unit 110 by using the signals received by the ultrasonic receivers 106 and the infrared signal sent by the infrared emitter 114. The calculated movement is transmitted from the microprocessor 250 to the motor control unit 280 which in turn operates the motors 220 and propellers 210.

In one embodiment, the space unit 110 has gyro-stabilizing system 270 that controls the speed of each motor 220 to avoid malfunction such as flipping over. The microprocessor 250 can also be connected to a radio receiver 240 to receive radio command signals.

Figure 3A:
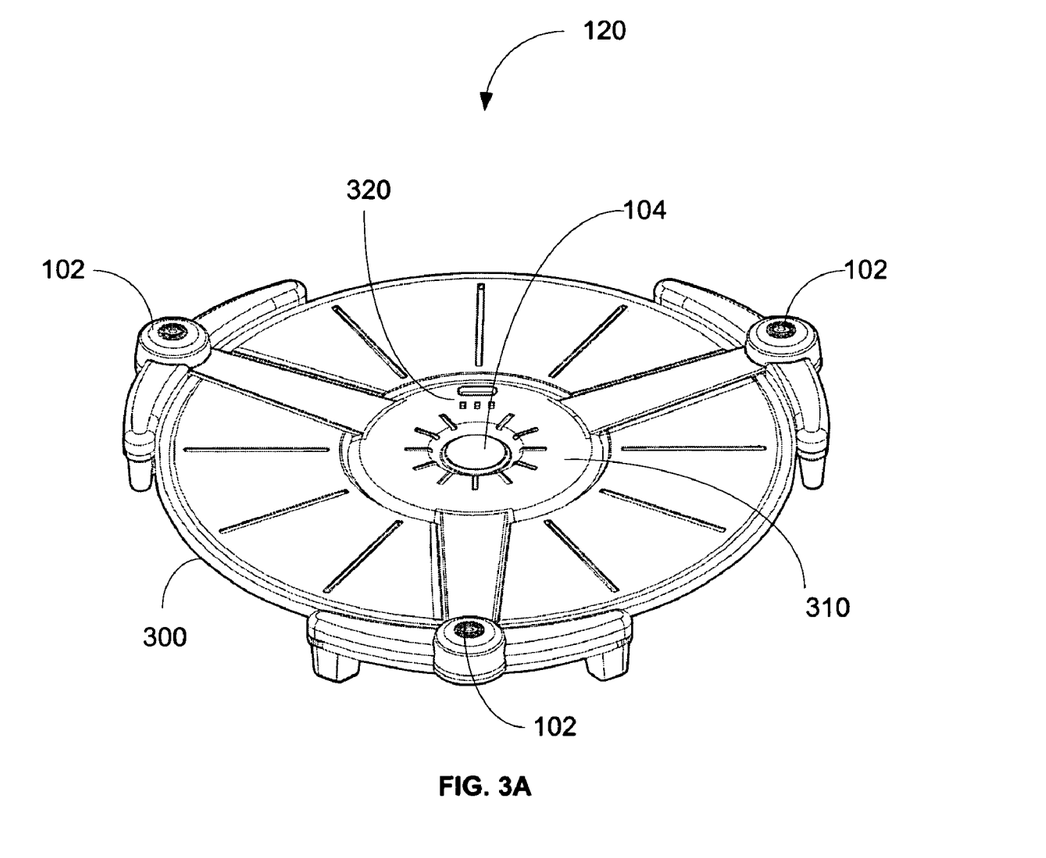
FIG. 3A illustrates a perspective view of a ground station unit.

FIG. 3A illustrates a perspective view of a ground station unit 120. In one embodiment, the ground station unit 120 is enclosed in one housing 300 which incorporates the three ultrasonic transmitters 102, the infrared receiver 104, a speaker 310, light emitting diodes 320 and a microprocessor (not shown). In one embodiment, the infrared receiver can be a phototransistor. In another embodiment, the infrared receiver can be a photoresistor.

Figure 3B:
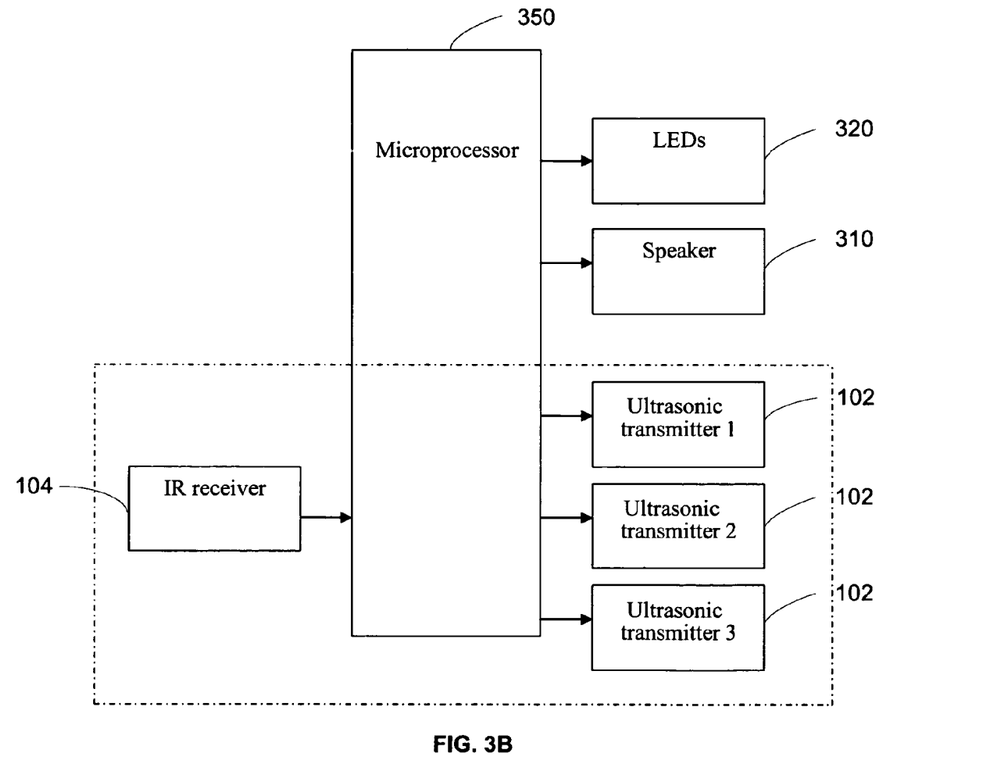
FIG. 3B illustrates a block diagram of the components of the ground station unit depicted in FIG. 3A.

FIG. 3B illustrates a block diagram of the components of the ground station unit 120 including a microprocessor 350. The infrared receiver 104 and the transmitters 102 are connected to the microprocessor 350. Based on signals received by the infrared receiver 104 the microprocessor 350 controls the emission of ultrasonic signals through transmitters 102. The microprocessor 350 is also coupled to the speaker 310 and the light emitting diodes 320 for indicating a status of the base station unit 120 and navigation of the space unit 110.

Figure 4:
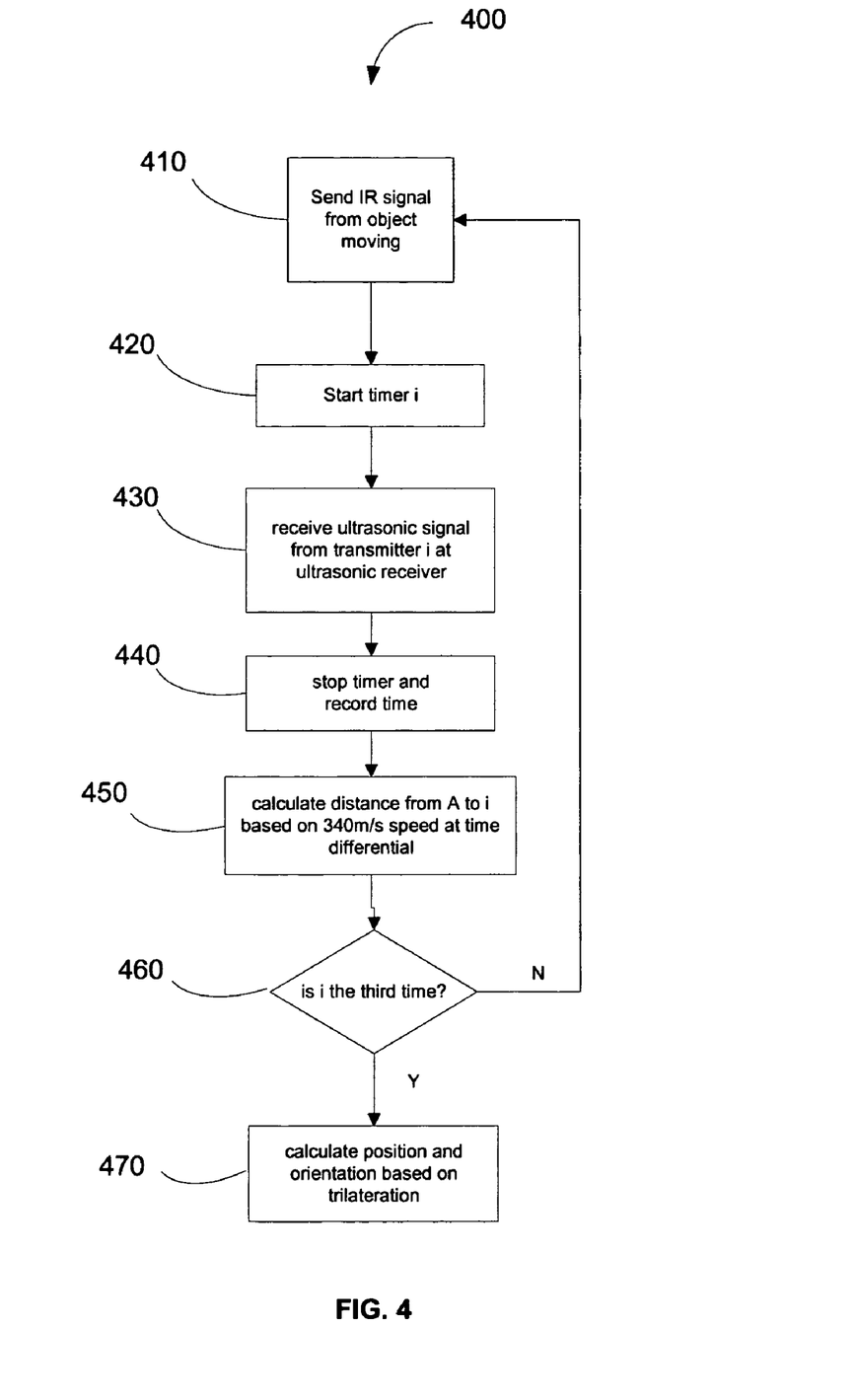
FIG. 4 illustrates a flow chart for a method to determine the spatial position and orientation of the space unit.

FIG. 4 illustrates a flow chart for a method 400 to determine the spatial position and orientation of the space unit 110. The spatial position of space unit 110 in relation to the ground station unit 120 is calculated by determining the distance between each of the ultrasonic emitters 102 and the ultrasonic receiver 106. The orientation of the space unit 110 in relation to the ground station unit 120 is calculated by using at least two ultrasonic receivers 106 and calculating their position in relation to the ground station unit 120.

During process block 410, the microprocessor 250 in the space unit 110 triggers an infrared light to be emitted from the light emitter 114 in the space unit 110 to the base station unit 120. In one embodiment, the infrared light may be emitted periodically. In another embodiment, the infrared light may be emitted every time the space unit 110 is turned on.

After sending the infrared signal, the microprocessor 250 starts a timer during process block 420. The base station unit 120 captures the signal using the infrared light receiver 104 which then communicates to the microcontroller 350 that an infrared signal has been received. The microcontroller then commands a first ultrasonic transmitter 102 to emit an ultrasonic signal.

In process block 430, the space unit 110 receives the first ultrasonic signal at the ultrasonic receiver 106. In another embodiment, the first ultrasonic signal is received by two ultrasonic receivers 106 for redundancy.

Once the microprocessor detects that the ultrasonic receiver 106 has received an ultrasonic signal, the microprocessor 250 stops the timer and records the time delay during process block 440. If a plurality of ultrasonic receivers 106 is used, the time elapsed between receiving the signal by one ultrasonic receiver 106 and the other can be slightly different. Therefore, the microcontroller 250 can calculate an average of the time delays for each ultrasonic receiver 106.

In another approach, if at least two ultrasonic receivers 106 are used, the orientation of the space unit 110 can also be calculated. The microcontroller 250 can be programmed with logic to perform geometrical and trigonometrical calculations to determine the orientation of the space unit 110. By using the position of the two ultrasonic receivers 106 and the straight line joining the two ultrasonic receivers 106, the microcontroller 250 can establish the position of the straight line with respect to the ultrasonic transmitters 102 in the ground station unit 120. In one embodiment, the straight line defined by the ultrasonic receivers 106 is parallel to the direction in which the space unit moves when moving forward or backwards. In another embodiment, the straight line defined by the ultrasonic receivers 106 is perpendicular to the direction in which the space unit moves when moving forward or backwards.

In yet another embodiment, the orientation of the space unit 110 can be determined by utilizing the distances from each of the ultrasonic transmitters 102 to each of the ultrasonic receivers 106. If the system utilizes three ultrasonic transmitters 102 and two ultrasonic receivers 106, a total of six distances can be used to determine the position of a line in space. The line in space defines the position and orientation of the space unit 110.

In process block 450, the microcontroller 250 calculates the distance from the first ultrasonic transmitter 102 to at least one ultrasonic receiver 106. Because the ultrasonic signal moves at the speed of sound (i.e. 340 m/s), the distance can be determined by measuring the amount of time it takes for the signal to reach the ultrasonic receiver 106. In other words, the distance is calculated by multiplying the time delay by the speed of sound.

The base station unit 120 captures the signal using the infrared light receiver 104 which then communicates to the microcontroller 350 that an infrared signal has been received. The microcontroller then commands one of the ultrasonic transmitters 102 to emit an ultrasonic signal.

In decision block 460, the microprocessor 250 determines whether an ultrasonic signal has been sent from all three transmitters 102. If the ultrasonic signal has not been sent to all three transmitters 102, the microprocessor 250 in space unit 110 repeats the procedure. Namely, sends another infrared signal as described in process block 410; then, starts the timer again as described in process block 420. Next, receives the ultrasonic signal at process block 430, stops the timer and recording the time as in process block 440, and calculates the distance from the ultrasonic transmitter 102 to the ultrasonic receiver 106 as in process block 450.

In another embodiment, the microprocessor 350 at the ground station unit 120 may send the three ultrasonic signals consecutively without waiting for an infrared signal to initiate the process. The space unit 110 can be calibrated to automatically reset the timer three times, after a predetermined amount of time, such that the timer is reset every time a new ultrasonic signal is emitted by an ultrasonic transmitter 102.

In yet another embodiment, the microprocessor 350 may send the three ultrasonic signals simultaneously. Each ultrasonic signal can have a different frequency thus providing a method of differentiating each arriving signal. Three timers can be used to record the travel time of each ultrasonic signal.

After decision block 460, if the all transmitters 102 sent an ultrasonic signal, the microprocessor 250 then determines the orientation and position of the space unit 110 in process block 470. The orientation of the space unit 110 is determined by using the position of two ultrasonic receivers 106 in relation to the ground station unit 120.

The spatial position of the space unit 110 is calculated by the microprocessor 250 using known three-dimensional trilateration methods that rely on the distances of three points in space in relation to an object. Since the flying speed of space unit 110 is relatively small (e.g. 1 m/s), it is assumed that the space unit 110 remains static during the time frame of three consecutive ultrasonic signal transmissions. Thus, the distances used in trilateration are assumed to be in relation to a static space unit 110.

Figure 5:
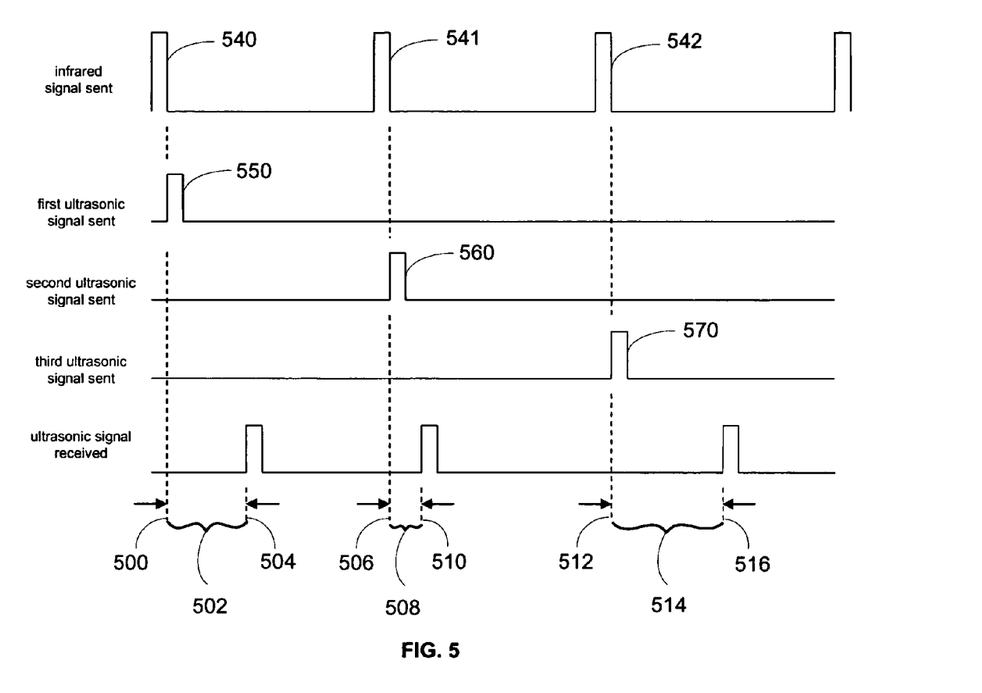
FIG. 5 illustrates a timing diagram of ultrasonic and infrared signals sent between the ground station unit and the space unit.

FIG. 5 illustrates a timing diagram of ultrasonic and infrared signals sent between the ground station unit and the space unit. A first infrared signal 540 starts a timer at time 500 to count a first time delay 502. The first infrared signal 540 triggers a first ultrasonic signal 550. As soon as the first ultrasonic signal is received at time 504 the time delay 502 is recorded.

A second infrared signal 541 starts a timer at time 506 to count a second time delay 508. The second infrared signal triggers a second ultrasonic signal 560. As soon as the second ultrasonic signal is received at time 510 the time delay 508 is recorded.

A third infrared signal 542 starts a timer at time 512 to count a third time delay 514. The third infrared signal triggers a third ultrasonic signal 570. As soon as the third ultrasonic signal is received at time 516 the time delay 514 is recorded.

Figure 6A:
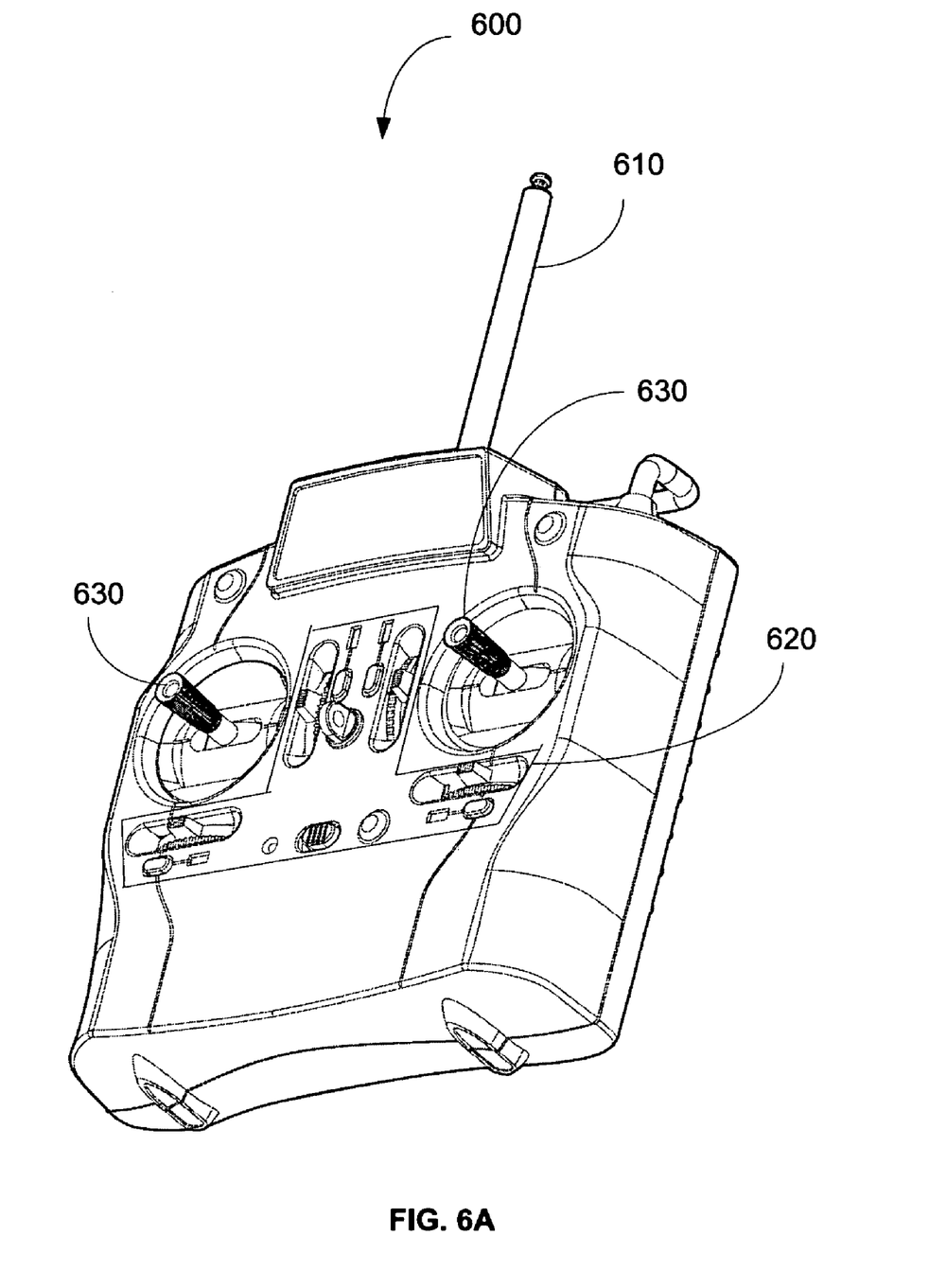
FIG. 6A illustrates a perspective view of a remote control unit.

FIG. 6A illustrates a perspective view of a remote control unit 600. An antenna 610 transmits signals corresponding to user input received by control sticks 630 and navigation keys 620. The navigation keys 620 and control sticks 630 permit the user to control yaw, roll and pitch motion, and throttle of the space unit 110. In one embodiment, the navigation keys can include auto-navigation keys which increase the freedom of the space unit 110.

Figure 6B:
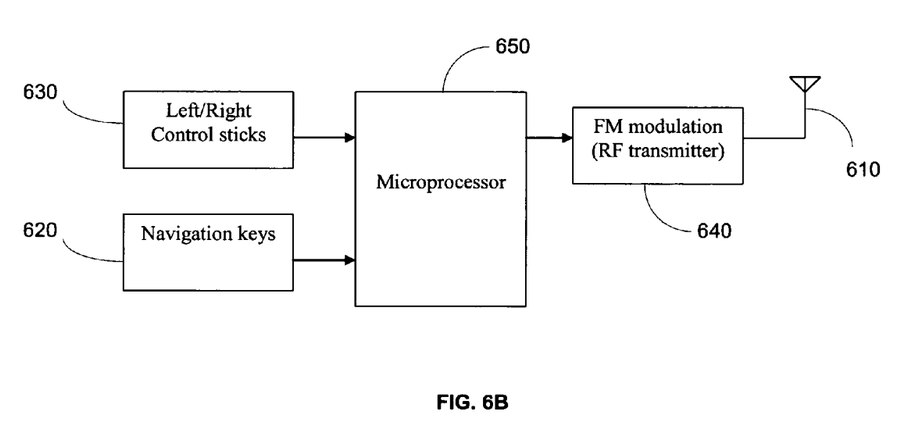
FIG. 6B illustrates a block diagram of the components of the control unit depicted in FIG. 6A.

FIG. 6B illustrates a block diagram of the components of the remote control unit 600 depicted in FIG. 6A. The control sticks 630 and the navigation keys 620 convey control signals to a microprocessor 650. The microprocessor 650 in turn emits radio frequency signals to the space unit 110 through a radio transmitter 640 and antenna 610.

In one embodiment, the remote control unit 600 can receive from the user a specific destination in space to which the space unit 110 must move. The microprocessor 650 can process the destination and transmit exact coordinates corresponding to the specific destination requested by the user.

Figure 7:
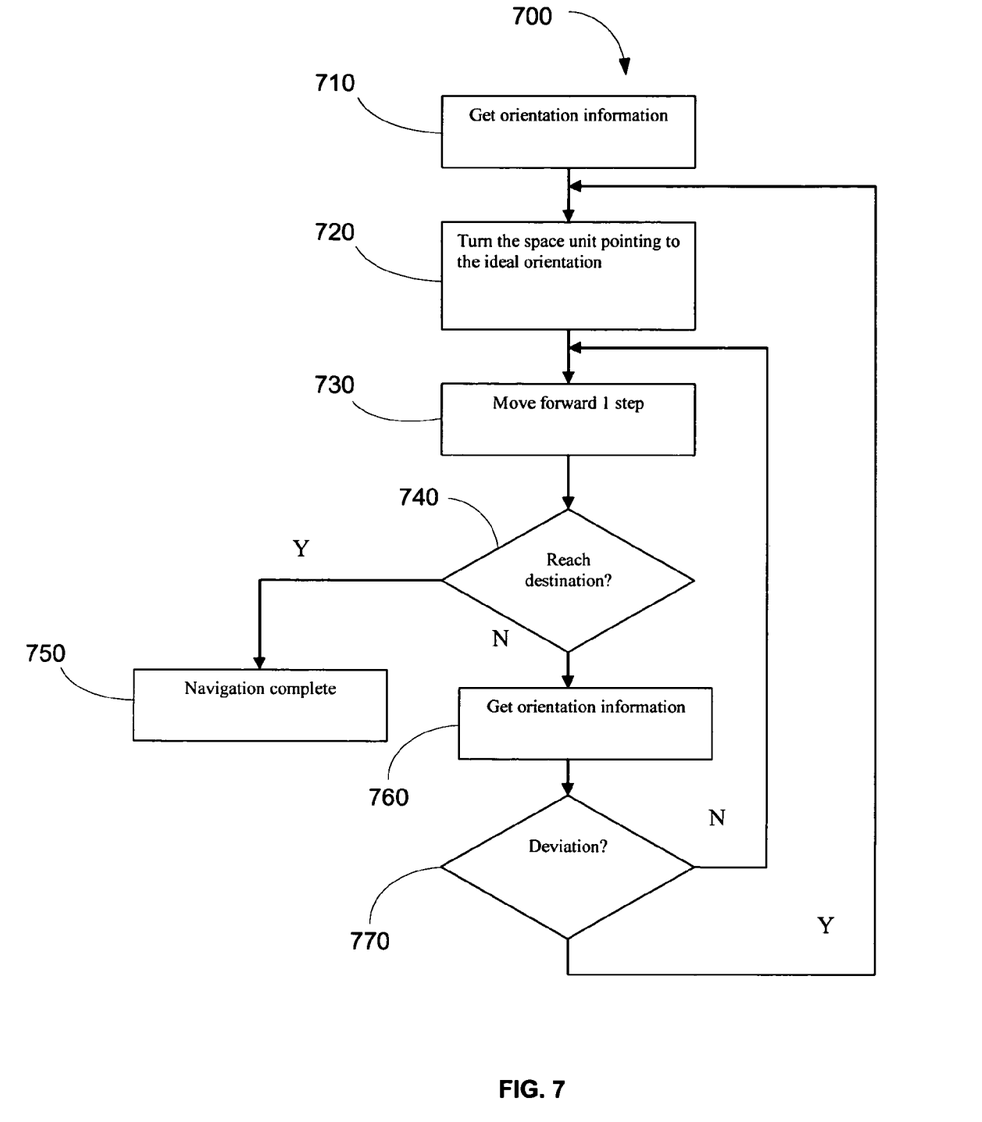
FIG. 7 illustrates a flow chart for a method of navigation of the space unit.

FIG. 7 illustrates a flow chart for a method of navigation 700 of the space unit 110 after a specific destination has been requested by the user. In process block 710, the space unit 110 determines its orientation information by utilizing the previously described method 400 which determines the spatial position and orientation of the space unit 110.

During process block 720, the space unit 110 is turned to point in direction of the specific destination. In process block 730, the space unit 110 moves forward one step. A step of the space unit 110 can be predefined to be movement of specific distance, or for a predetermined amount of time. Navigation of the space unit 110 can be achieved through the control of motors speed or rudder or elevators by the microprocessor in the space unit 110.

In decision block 740, the microprocessor 250 in the control unit 110 determines whether the specific destination has been reached. If so, the destination is deemed complete in process block 750. Otherwise, in process block 760 the space unit 110 determines once again its orientation information by utilizing the method 400, which in turn determines the spatial position and orientation of the space unit 110.

Subsequently, in decision block 770, the microprocessor 250 in the control unit 110 determines whether there has been a deviation from a straight path to the previously established specific destination. If so, method continues at process block 720 where the space unit 110 is turned to point in the ideal orientation towards the specific destination, moving forward one step at process block 730, inquiring whether the destination has been reached at decision block 740, and so on. Otherwise, if during decision block 770 the space unit 110 determines that there has not been a deviation, the method continues at process block 730 where the space unit 110 moves forward one step at process block 730, inquires whether the destination has been reached at decision block 740, and so on, until the final specific destination is reached.

In another embodiment, a spatial boundary can be preprogrammed in the space unit 110 such that the space unit 110 does not leave the coverage region of the ultrasonic transmitters 102. The microprocessor 250 in the space unit 110 can be configured to operate the motor control unit so that the space unit 110 flies randomly within the coverage region. In another approach, the microprocessor 250 in the space unit 110 can be preprogrammed with a plurality of destination points so as to define a path within the coverage region. In yet another embodiment, a destination point for landing can be defined so that the space unit 110 can implement a series of take off, autopilot and landing functions.

In another embodiment, the microprocessor 250 can be programmed to compensate for user errors avoiding crashes on the ground. To that end, the microprocessor 250 may stop the space unit 110 to continue a downwards movement if the microprocessor calculates that the distance to any one of the ultrasonic transmitters 102 is less than a predetermined amount (e.g. 1 ft). On another embodiment, the microprocessor 250 may discontinue downwards movement of the space unit 110 if the microprocessor calculates its distance from the ground to be less than a predetermined amount.

There are other variations of the system and method disclosed herein. For example, the moving object can be a flying toy, a bouncing toy, a rolling toy, etc. Although the disclosed system may be more beneficial for slow-moving objects, the moving object can be any other flying object such as an airplane, helicopter, air balloon, missile, rocket, etc. In addition, the moving object can be any other mode of motorized and unmotorized transportation such as automobiles, trucks, boats, motorcycles, bicycles, tricycles, etc.

The method and system can include more than three ultrasonic transmitters and more than one ultrasonic receiver. In addition, more than one moving object can be in communication and operation to the ground station.

Furthermore, besides infrared radiation, other type of electromagnetic radiation can be used. For example, visible light waves, radio waves, microwaves, ultraviolet light waves, X-rays and gamma rays can also be utilized. In like manner, sonic sound waves can be used instead of ultrasonic sound waves. In other words, sound waves of any frequency can be used regardless of whether they are audible or non-audible to the human ear.

Although certain illustrative embodiments and methods have been disclosed herein, it will be apparent form the foregoing disclosure to those skilled in the art that variations and modifications of such embodiments and methods may be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method of determining the position of a moving flying object in a space, comprising:
   determining a first distance from a first sonic receiver mounted on the moving object to a first sonic transmitter located at a ground station unit, wherein the step of determining the first distance comprises:
      emitting a first infrared light signal from the moving object to a first infrared light receiver located at the ground station unit;
      initiating a time counter upon transmitting the infrared light signal;
      receiving a first sonic signal from the first sonic transmitter;
      stopping the time counter upon receiving the first sonic signal; and
      multiplying a predetermined speed constant by a time indicated by the time counter;
   determining a second distance from the sonic receiver mounted on the moving object to a second sonic transmitter located at the ground station unit, the second sonic transmitter being located at a spaced distance from the first sonic transmitter;
   determining a third distance from the sonic receiver mounted on the moving object to a third sonic transmitter located at the ground station unit, and the third sonic transmitter being located at a spaced distance from the first and second sonic transmitter;
   utilizing the first distance, the second distance and the third distance to determine the position of the moving object in relation to the ground station unit;
   controlling through a remote control system using radio frequency modulation with signals corresponding to user input at least one of the yaw, roll, pitch motion, and also the throttle of the flying object space unit, and the control is through moving navigation keys and a control stick to convey control signals to a microprocessor, the microprocessor in turn emits signals to the flying object space unit through radio frequency signals from a radio transmitter and antenna; and
   wherein the first sonic transmitter, the second sonic transmitter and the third sonic transmitter are located relative to each other such that lines between them form a triangular configuration, and the moving flying object includes a propeller operable by a motive system, the propeller being arranged to be in a horizontal plane when the object is flying, and the propeller periphery is encircled with a protective circumferential outer structure, and including a gyro-stabilizing system for controlling the speed of the propeller thereby to control the movement of the object.

2. The method of claim 1 wherein the step of determining the second distance comprises:
   emitting a second infrared light signal from the moving object to the infrared light receiver located at the ground station unit, the second infrared signal being at a different time to the emission of the first infrared signal;
   reinitiating the time counter upon transmitting the second infrared light signal;
   receiving a second sonic signal from the second sonic transmitter;
   stopping the time counter upon receiving the second sonic signal; and
   multiplying the predetermined speed constant by the time indicated by the time counter.

3. The method of claim 2, wherein the step of determining the third distance comprises:
   emitting a third infrared light signal from the moving object to the infrared light receiver located at the ground station unit; the third infrared signal being at a different time to the emission of the first and the infrared signals;
   reinitiating the time counter upon transmitting the third infrared light signal;
   receiving a third sonic signal from the third sonic transmitter;
   stopping the time counter upon receiving the third sonic signal at the sonic receiver; and
   multiplying the predetermined speed constant by the time indicated by the time counter.

4. The method of claim 1, wherein the step of determining the second distance comprises:
   reinitiating a time counter after a predetermined amount of time;
   receiving a second sonic signal from the second sonic transmitter, the second sonic signal being sent after the predetermined amount of time passed since the first sonic signal was received;
   stopping the time counter upon receiving the second sonic signal at the sonic receiver; and
   multiplying a predetermined speed constant by the time indicated by the time counter.

5. The method of claim 4, wherein the step of determining the third distance comprises:
   reinitiating a time counter after a predetermined amount of time;
   receiving a third sonic signal from the third sonic transmitter, the third sonic signal being sent after the predetermined amount of time passed since the second sonic signal was received;
   stopping the time counter upon receiving the third sonic signal at the sonic receiver; and
   multiplying a predetermined speed constant by the time indicated by the time counter.

6. The method of claim 2, wherein the first sonic signal, the second sonic signal, and the third sonic signal have different sonic frequencies from each other.

7. The method of claim 1, wherein the step of determining the position of the moving object in relation to the ground station unit is performed by trilateration.

8. A method of determining the position of a flying toy moving object in a space, comprising:
   determining a first distance from a sonic receiver mounted on the moving object to a first sonic transmitter located at a ground station unit, wherein the step of determining the first distance comprises:
      emitting an infrared light signal from the moving object to an infrared light receiver located at the ground station unit;
      initiating a time counter upon transmitting the infrared light signal;
      receiving a first sonic signal from the first sonic transmitter;
      stopping the time counter upon receiving the first sonic signal; and
      multiplying a predetermined speed constant by a time indicated by the time counter;
   determining a second distance from the sonic receiver mounted on the moving object to a second sonic transmitter located at the ground station unit;
   determining a third distance from the sonic receiver mounted on the moving object to a third sonic transmitter located at the ground station unit;

utilizing the first distance, the second distance and the third distance to determine the position of the moving object in relation to the ground station unit, controlling through a remote control system using radio frequency modulation with signals corresponding to user input at least one of the yaw, roll, pitch motion, and also the throttle of the flying space unit, and the control is through moving navigation keys and a control stick to convey control signals to a microprocessor, the microprocessor in turn emits signals to the flying space unit through radio frequency signals from a radio transmitter and antenna; and wherein the first sonic transmitter, the second sonic transmitter and the third sonic transmitter are located relative to each other such that lines between them form a triangular configuration, and the infrared light signal receiver is located in the triangle, the first, second, and third transmitters being mounted in a single housing, the moving object including a motive system, multiple propellers being operable by the motive system, and the propellers being arranged laterally relative to each other and being directed generally to be in a horizontal plane when the object is flying.

9. The method of claim 1, wherein the moving object is configured to reach a specific destination by using the position of the moving object in relation to the specific destination.

10. The method of claim 9, wherein the moving object is configure to follow a specific path defined by a plurality of specific destinations.

11. The method of claim 1, further comprising:
determining a fourth distance from a second sonic receiver mounted on the moving object to the first sonic transmitter located at a ground station unit;
determining a fifth distance from the second sonic receiver mounted on the moving object to the second sonic transmitter located at the ground station unit;
determining a sixth distance from the second sonic receiver mounted on the moving object to the third sonic transmitter located at the ground station unit; and
utilizing the first distance, the second distance, the third distance, the fourth distance, the fifth distance and the sixth distance to determine the position of the moving object in relation to the ground station unit.

12. The method of claim 11, further comprising utilizing the first distance, the second distance, the third distance, the fourth distance, the fifth distance and the sixth distance to determine the orientation of the moving object in relation to the ground station unit.

13. The method of claim 1 including controlling through the remote control system using radio frequency modulation with signals corresponding to user input at least two of the yaw, roll, pitch motion of the space unit.

14. The method of claim 1 including controlling through the remote control system using radio frequency modulation with signals corresponding to user input at least three of the yaw, roll, pitch motion of the space unit.

15. The method of claim 1 including having the remote control system receive from a user a specific destination in space for moving the space unit.

16. A method of determining the position of a moving flying object in a space, comprising:
determining a first distance from an ultrasonic receiver mounted on the moving object to a first ultrasonic transmitter located at a ground station unit, wherein the step of determining the first distance comprises:
emitting an infrared light signal from the moving object to an infrared light receiver located at the ground station unit;
initiating a time counter upon transmitting the infrared light signal;
receiving a first ultrasonic signal from the first ultrasonic transmitter;
stopping the time counter upon receiving the first ultrasonic signal; and
multiplying a predetermined speed constant by a time indicated by the time counter;
determining a second distance from the ultrasonic receiver mounted on the moving object to a second ultrasonic transmitter located at the ground station unit;
determining a third distance from the ultrasonic receiver mounted on the moving object to a third ultrasonic transmitter located at the ground station unit;
utilizing the first distance, the second distance and the third distance to determine the position of the moving object in relation to the ground station unit;
controlling through a remote control system using radio frequency modulation with signals corresponding to user input at least one of the yaw, roll, pitch motion, and also the throttle of the space unit, and the control is through moving navigation keys and a control stick to convey control signals to a microprocessor, the microprocessor in turn emits radio frequency signals to the space unit through a radio transmitter and antenna; and
the first sonic transmitter, the second sonic transmitter and the third sonic transmitter are located relative to each other such that lines between them form an equilateral triangular configuration, and the infrared light signal receiver being located at the center of the triangle.

17. A method of determining the position of a moving flying toy object in a space, comprising:
determining a first distance from an ultrasonic receiver mounted on the moving object to a first sonic transmitter located at a ground station unit, wherein the step of determining the first distance comprises:
emitting an infrared light signal from the moving object to an infrared light receiver located at the ground station unit;
initiating a time counter upon transmitting the infrared light signal;
receiving a first sonic signal from the first sonic transmitter;
stopping the time counter upon receiving the first sonic signal; and
multiplying a predetermined speed constant by a time indicated by the time counter;
determining a second distance from the sonic receiver mounted on the moving object to a second sonic transmitter located at the ground station unit;
determining a third distance from the sonic receiver mounted on the moving object to a third sonic transmitter located at the ground station unit;
utilizing the first distance, the second distance and the third distance to determine the position of the moving object in relation to the ground station unit,
controlling through a remote control system using radio frequency modulation with signals corresponding to user input at least one of the yaw, roll, pitch motion, and also the throttle of the space unit, and the control is through moving navigation keys and a control stick to convey control signals to a microprocessor, the microprocessor in turn emits signals to the space unit through radio frequency signals from a radio transmitter and antenna; and wherein the first sonic transmitter, the second sonic transmitter and the third sonic transmitter are located relative to each other such that lines between them form an equilateral triangular configuration, and the infrared light signal receiver is located in the triangle, the first, second, and third transmitters being mounted in a single housing, and the moving object includes a motive system, the motive system having multiple propellers operable by the motive system, the propellers being arranged laterally relative to each other and being directed generally to be in a horizontal plane when the object is flying, and the propellers being surrounded by circumferentially protective rings.

* * * * *